(12) United States Patent
Ondrasik

(10) Patent No.: US 6,203,035 B1
(45) Date of Patent: Mar. 20, 2001

(54) NESTABLE PLATTER CART

(76) Inventor: V. John Ondrasik, 6150 Sheila St., Los Angeles, CA (US) 90040-2407

( * ) Notice: Subject to any disclaimer, the term of this patent is extended or adjusted under 35 U.S.C. 154(b) by 0 days.

(21) Appl. No.: 09/069,415

(22) Filed: Apr. 29, 1998

(51) Int. Cl.⁷ ...................................................... B62B 5/00
(52) U.S. Cl. .................. 280/79.3; 280/47.35; 211/126.1
(58) Field of Search ................ 280/79.3, 47.35, 280/47.34, 33.991; 211/126.1, 126.2, 126.7

(56) References Cited

U.S. PATENT DOCUMENTS

| | | |
|---|---|---|
| D. 161,183 | 12/1950 | Irwin . |
| 2,928,681 * | 3/1960 | Wilson ................................ 280/33.99 |
| 2,982,422 * | 5/1961 | Asproyerakas ........................ 211/134 |
| 2,992,010 * | 7/1961 | Sides ................................... 280/33.99 |
| 3,232,442 | 2/1966 | Wilson . |
| 3,272,528 * | 9/1966 | Young et al. ....................... 280/33.99 |
| 3,527,360 | 9/1970 | Thielking . |
| 3,920,258 * | 11/1975 | Lundstrom et al. ............... 280/33.99 |
| 4,004,819 * | 1/1977 | Brongo ................................. 280/79.3 |
| 4,627,542 * | 12/1986 | Fredrickson ......................... 211/150 |
| 4,911,308 | 3/1990 | Nylund . |
| 5,125,520 | 6/1992 | Kawasaki . |
| 5,330,060 | 7/1994 | Bohner . |
| 5,538,145 | 7/1996 | Held . |

* cited by examiner

Primary Examiner—Christopher P. Ellis
Assistant Examiner—Rashmi Sharma
(74) Attorney, Agent, or Firm—Brown, Martin, Haller & McClain, LLP

(57) ABSTRACT

A platter cart for carrying a plurality of loaded trays has an upwardly extending, wheeled support frame and a plurality of spaced horizontal shelves secured between the opposite sides of the frame. Each shelf comprises a bar extending between the sides of the frame and formed into a serpentine configuration including at least a central portion of generally W-shape, the serpentine configuration having a central axis of symmetry aligned with the central axis of the frame. The sides of the cart are generally tapered inwardly from the rear to the front end of the frame, and the frame is open at its rear end so that carts can be nested together with the W-shaped shelves and tapered sides interfitting for nesting purposes.

13 Claims, 3 Drawing Sheets

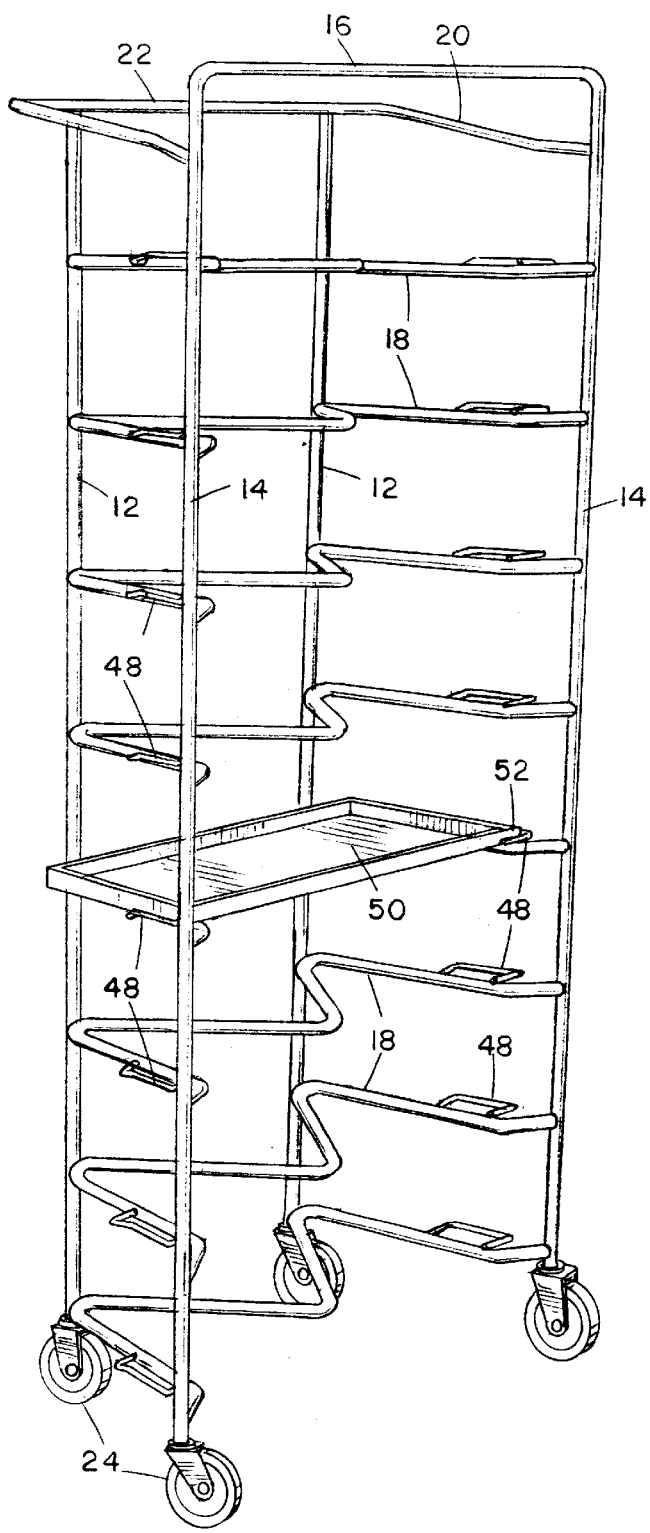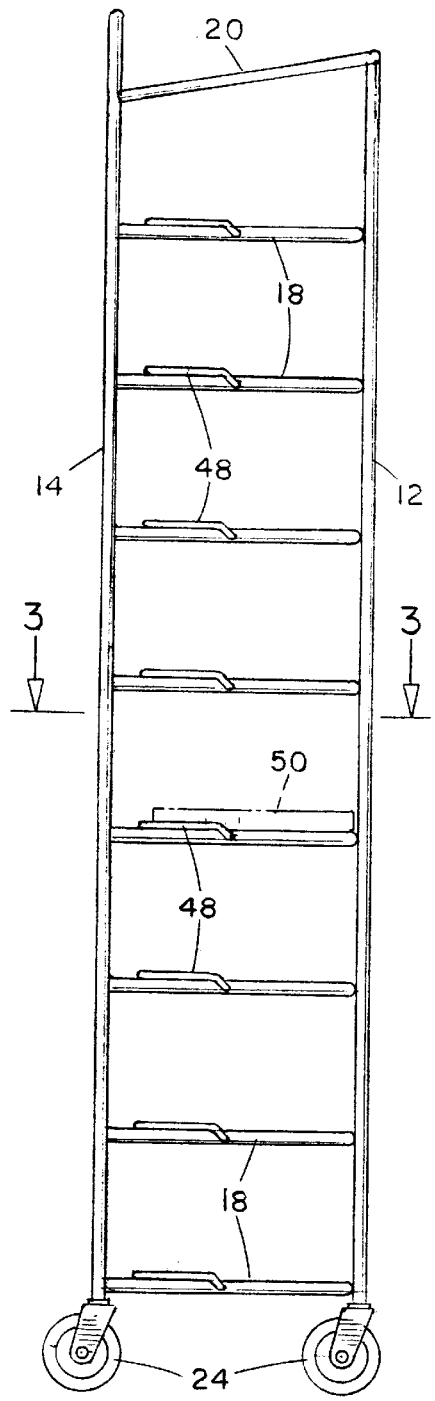
FIG. 1
FIG. 2

NESTABLE PLATTER CART

BACKGROUND OF THE INVENTION

The present invention relates generally to wheeled platter carts or tray carrying racks for transporting commodities on trays or platters from one location to another, for example from a storage area or freezer to customer accessible shelving units of a grocery store. It is particularly concerned with a platter cart which is nestable for reducing storage area requirements when the cart is not in use.

Platter carts are generally large and have a vertical support frame with caster wheels at the lower end of the frame, and a plurality of spaced horizontal shelves of rectangular shape for supporting generally rectangular trays carrying food or the like. Such carts are normally not nestable, due to the shape of the frame and the closed rectangular periphery of the shelves, and therefore take up considerable amounts of storage space when not in use. It is difficult to design such carts to be nestable while still maintaining sufficient support for rectangular trays, and allowing the trays to be readily placed onto shelves and lifted off shelves as required. However, some nestable arrangements have been provided in prior art platter carts or tray racks. In U.S. Pat. No. 5,125,520, for example, a tray rack is provided with tray supports or shelves which are z-shaped to allow for nesting. This has the disadvantage that racks cannot be nested together in a straight line, but are offset to one side of the central axis of the first rack as they are successively nested together. This does not provide an optimum storage configuration, and also has structural problems.

In U.S. Pat. No. 2,928,681 of Wilson, the tray carrying racks have generally U-shaped top and bottom members which are tapered to allow for nesting, and the tray supports are simply angle members for supporting the corners of trays. The tray supports are arranged to telescope together when the racks are nested together. This may give insufficient support to trays in some cases.

Another known alternative is described in U.S. Pat. No. 3,272,528 of Young et al., in which the shelves of the platter cart may be tilted upwardly for nesting when not in use.

SUMMARY OF THE INVENTION

It is an object of the present invention to provide a new and improved nestable platter cart.

According to the present invention, a platter cart is provided which comprises an upwardly extending support frame having a lower end, a plurality of wheels secured at the lower end of the support frame, an upper end, an open rear end, a forward end, and spaced sides, and central axis aligned with the direction of travel of the cart, a plurality of spaced horizontal shelves secured between the opposite sides of the frame, the sides of the frame being tapered outwardly from the front to the rear of the frame, and each shelf comprising a bar extending between the sides of the frame and formed into a serpentine configuration including at least a portion of generally W-shape, the serpentine configuration having a central axis of symmetry aligned with the central axis of the frame from the rear to the front end of the cart.

Each segment of the serpentine bar forming each shelf is outwardly tapered from the front to the rear end of the cart, so that the open rear end, tapered shelf segments and sides of the frame allow carts to be nested together in alignment for storage purposes. The wider rear end of the cart also allows store clerks to access the shelves more readily to place trays onto the shelves or remove trays from the shelves by lowering or lifting the tray, rather than sliding the tray in and out as in the past, which can be unstable if the tray and supported food items are relatively heavy.

Preferably, the upper end of the frame projects forwardly from the forward ends of the shelves, so that when the cart is pushed through swing doors, the frame will contact the door before any tray reaches the door, reducing the risk of trays accidentally becoming dislodged. The shelves may include two generally V-shaped sections connected at the center of the shelf to form an overall W-shape, or may have three or more V-shaped sections to provide added support beneath each tray. Tray stops may be provided at the opposite sides of each shelf, to prevent movement of the tray on the shelf during transportation.

The platter cart of this invention is readily nestable to form a straight line array of nested carts. Individual carts may be readily loaded and unloaded with trays of food or other items, and the trays will be held securely during transportation from a storage space to the inside of a store for loading freezer or other display shelves.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a perspective view of a platter- or tray-carrying cart according to a first embodiment of the invention, showing a tray in place;

FIG. 2 is a side view of the cart;

DESCRIPTION OF THE PREFERRED EMBODIMENTS

Figure 3:
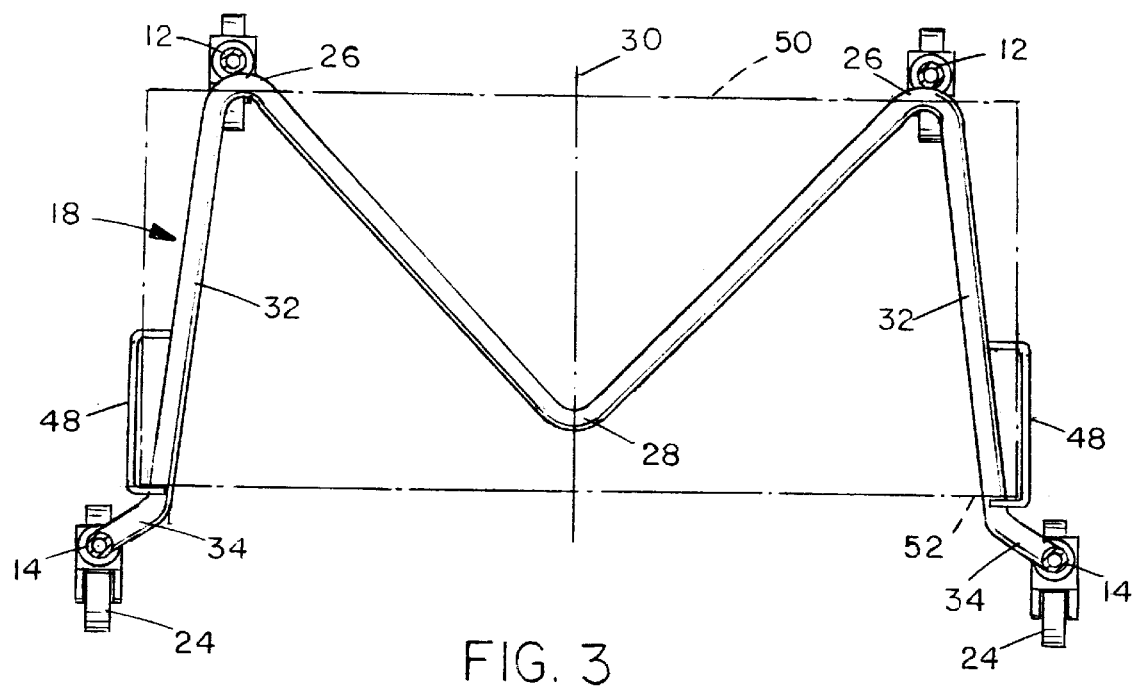
FIG. 3 is an enlarged sectional view taken on line 3—3 of FIG. 2, with a tray indicated in broken line.
Figure 4:
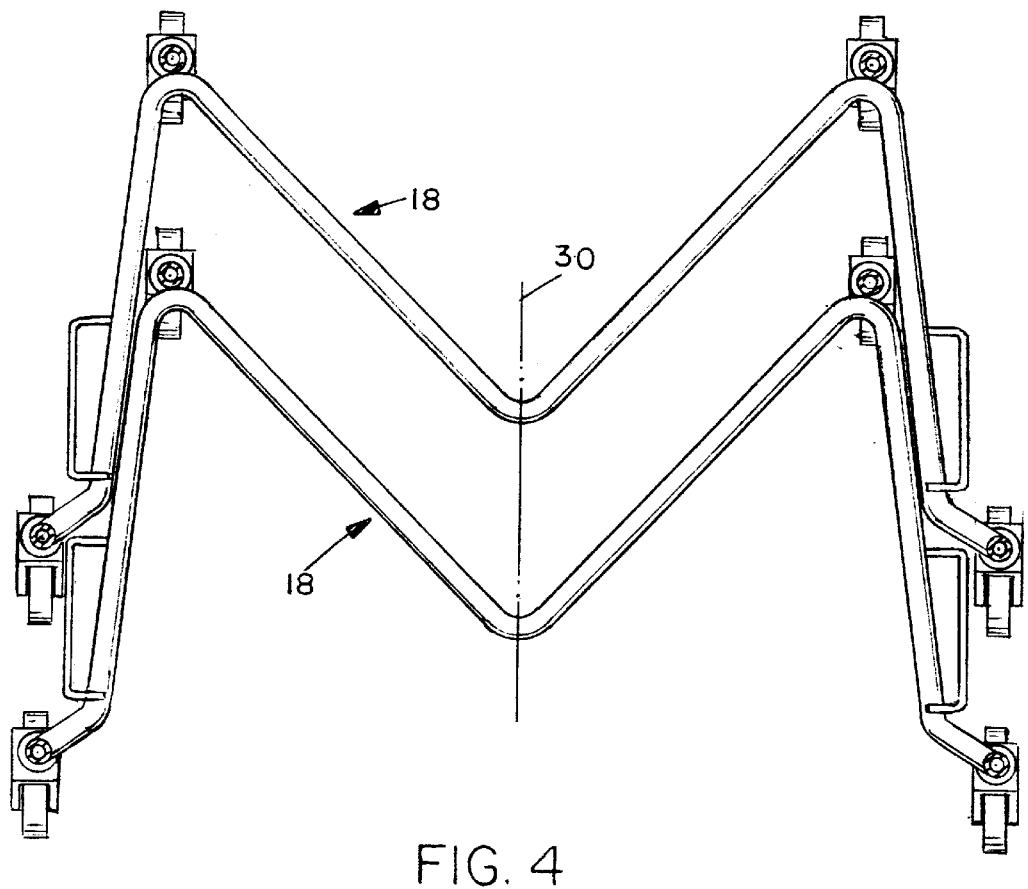
FIG. 4 is a similar view showing the nesting of two carts.

FIGS. 1 to 3 illustrate a nestable platter or tray-carrying cart 10 according to a first embodiment of the present invention, while FIG. 4 illustrates two carts 10 nested together for storage. It will be understood that additional carts may be nested with the first two in an identical manner.

The cart 10 basically comprises a vertical support frame of metal rod or tube construction, having a pair of front upright members 12, a pair of rear upright members 14 joined together at their upper ends by a U-shaped connecting portion 16, and a plurality of spaced, generally horizontal shelves or platforms 18 welded between the upright members 12 and 14. A U-shaped upper frame member 20 extends from the rear uprights and is welded to the upper ends of the front upright members 12 to form a cross bar 22 across the front of the frame. A caster wheel 24 is mounted at the lower end of each of the four upright members 12, 14.

The rear upright members 14 are spaced farther apart than the front upright members 12, so as to form a frame which has outwardly tapering sides from the front to the rear of the frame. Each shelf 18 is also formed from a bent metal tube or rod, and the tube or rod is preferably shaped to form a generally W-shaped configuration, as best illustrated in FIG. 3, or two V-shapes with forwardly facing apices 26 joined together at rearwardly facing apex 28 at the center of the W-shape, which lies on the central, front to rear axis 30 of the cart itself. Each shelf is welded to the front upright members 12 of the frame at the respective apex 26, with the apex welded on the rear side of the respective member 12 as indicated in FIG. 3. The outermost legs 32 of the W-shape each have an outwardly flared end portion 34 which is welded to a respective rear upright member 14, and the legs 32 are slightly tapered outwardly. This enables carts to nest together as indicated in FIG. 4.

Figure 5:
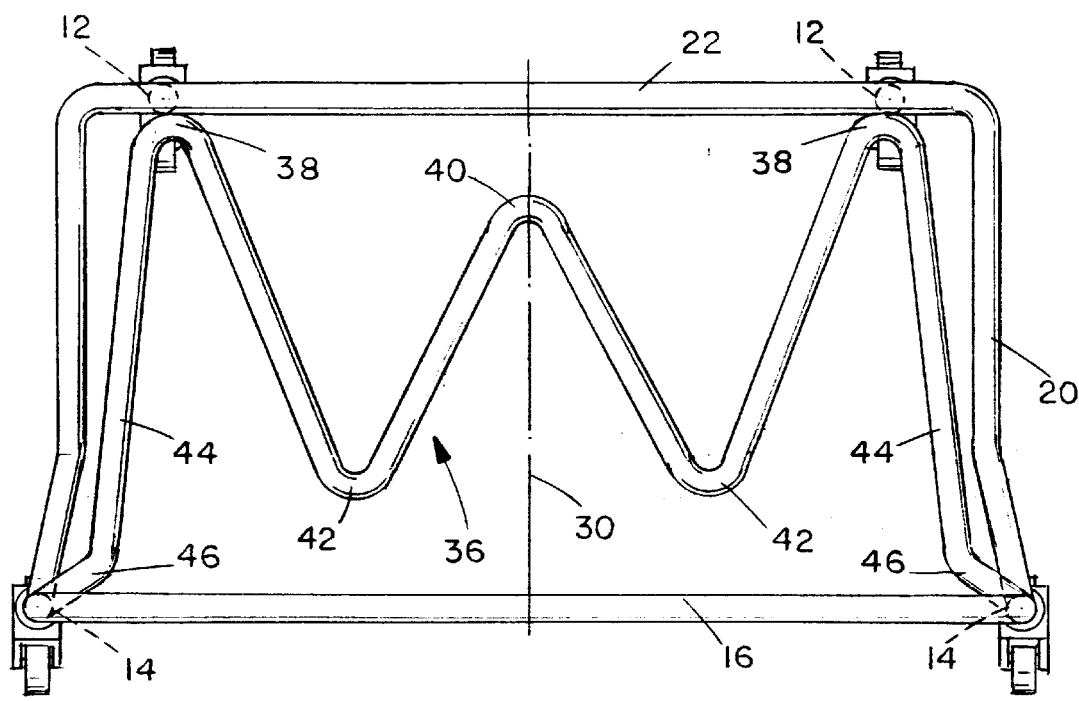
FIG. 5 is a top plan view of the cart, showing an alternative platform or shelf configuration.
Figure 6:
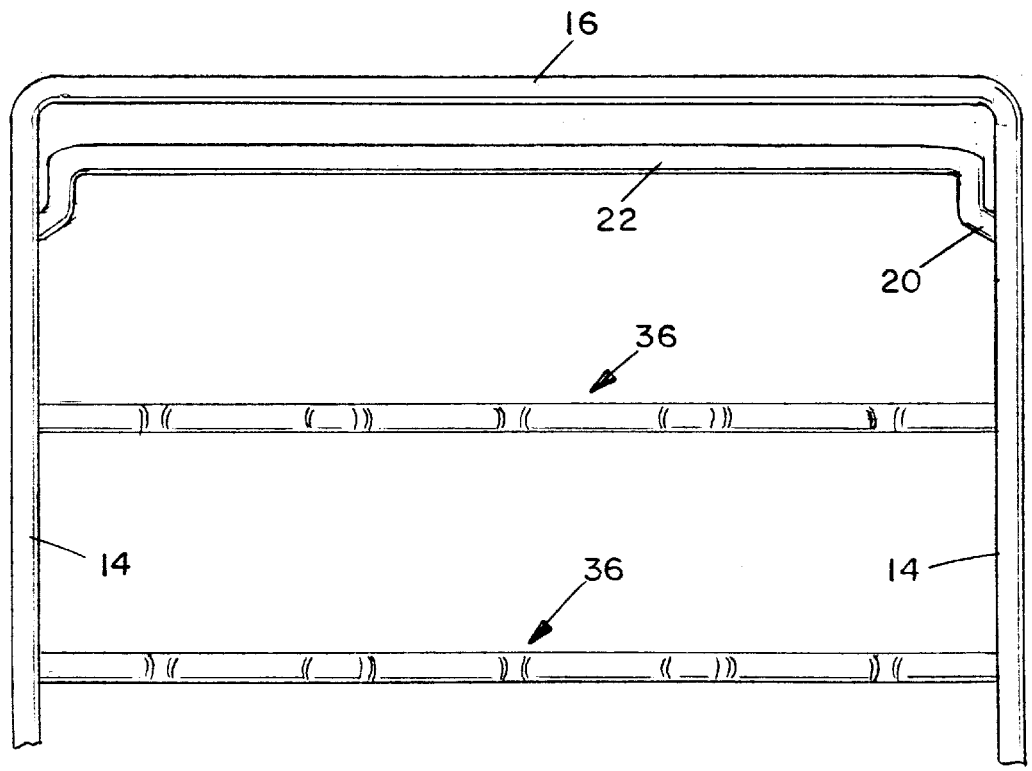
FIG. 6 is a rear view of the upper portion of FIG. 5.

FIGS. 5 and 6 illustrate a modified shelf 36 which has more bends than the shelf 18. The cart construction will be otherwise identical to that of FIGS. 1 to 4, and like reference numerals have been used as appropriate. Shelf 36 is formed from a metal tube or rod which is bent to form five interconnecting V-shaped bends, comprising two outer V-bends with forwardly facing apices 38, a central V-bend having a central, forwardly facing apex 40, with the central V-bend being joined to the two outer V-bends via rearwardly facing V-bends 42. Thus, shelf 36 has two additional serpentine bends over the shelf of FIGS. 1 to 4, which provides additional support for a tray or platter. As in the previous embodiment, the outer side legs 44 of each shelf are outwardly tapered and have a flared end portion 46 welded to the respective rear upright member 14.

Returning to the embodiment of FIGS. 1 to 4, each shelf 18 preferably has a tray or platter stop 48 on each outer side leg 32, for properly locating and holding a tray 50, as best illustrated in FIG. 1. It will be understood that similar stop devices may be provided on the shelf 36 of FIGS. 5 and 6. Each stop 48 comprises a generally U-shaped bent wire or rod which is welded to the respective leg 32 at its free ends, and which is bent upwardly to form an angle or corner stop to locate a respective rear corner 52 of tray 50, as best illustrated in FIGS. 1 and 3. This will prevent a tray from sliding from side to side, or rearwardly. The front upright members 12 will locate the forward end of the tray, as illustrated in FIG. 1.

The outwardly tapered outer side legs of each shelf along with the tapered frame shape and open rear end of the frame, allows a plurality of carts to be readily nested together for storage purposes, as indicated in FIG. 4, and the nested carts will all be aligned on central axis 30 for ready storage in a straight row. The wide, open rear end of the frame and shelves allows trays to be readily placed onto shelves and removed from shelves after emptying. Unlike previous arrangements, where the only option was to slide trays into and off a rectangular, closed frame shelf, store personnel can readily stand in the open rear end of the frame to place trays or platters directly down onto each shelf or lift them up from a shelf. This avoids any instability which may result on sliding a heavy tray onto a shelf.

Once the platter cart 10 is fully loaded, it can be pushed by store personnel gripping the rear upright members 14. Generally, storage areas and freezers in grocery stores have swing doors, and the cart is pushed into the swing door to open the doors while the store clerk pushes from the rear. The upper cross bar 22 projects out in front of the forward end of all trays, as indicated in FIGS. 1, 3 and 5, and will thus contact the swing doors before any tray reaches the door. The cross bar 22 acts to push the swing doors open and out of the way, so that there is no risk of a tray accidentally becoming dislodged on impact with the doors.

The shelves in the illustrated embodiments are of generally serpentine shape with a central axis of symmetry aligned with the central, front to rear axis of the cart itself. In the preferred embodiment, each shelf has at least one portion which is of W-shape, and may include additional undulations on the outside of the central W-shape. Shelves may be provided with a greater number of V-bends than the embodiments of FIGS. 3 and 5, if desired. The outer side legs are tapered outwardly, and each leg or section of the bent tube between adjacent bends or apices is also tapered or inclined from the front to the rear of the cart to ensure that the shelves can be readily nested together.

Although some preferred embodiments of the invention has been described above by way of example only, it will be understood by those skilled in the field that modifications may be made to the disclosed embodiments without departing from the scope of the invention, which is defined by the appended claims.

I claim:

1. A platter cart for carrying a plurality of loaded trays, comprising:

an upwardly extending support frame having a lower end, caster wheels secured at the lower end of the support frame, an upper end, a rear end, a forward end, and spaced opposite sides, and a central horizontal axis extending from the rear end to the forward end of the frame, the frame being wider at the rear end than the forward end;

a plurality of vertically spaced horizontal shelves secured between the opposite sides of the frame, each shelf comprising a single, continuous bar extending between the opposite sides of the frame and formed into a serpentine configuration including at least a portion of generally W-shape, the serpentine configuration having a central axis of symmetry aligned with the central horizontal axis of the frame;

the bar having at least three generally V-shaped bends, the bends including a pair of outer side bends at the forward end of the frame and at least one rearwardly facing bend, each outer side bend having an outer leg with a free end secured to the rear end of the frame, and an apex secured to the forward end of the frame, and the rearwardly facing bend being free and unattached to the frame; and the bar including an inner portion extending between said outer side bends, the entire inner portion of the bar being completely free and unattached to the frame.

2. The cart as claimed in claim 1, wherein the bar has three generally V-shaped bends, the bends comprising the pair of outer side bends and a central bend on said central axis of symmetry, the central bend facing rearwardly and being free and unattached to the frame.

3. The cart as claimed in claim 1, wherein the bar has five generally V-shaped bends, comprising the pair of outer side bends, and three inner bends between the outer side bends, the three bends comprising a pair of rearwardly facing bends and a central, forwardly facing bend on said central axis of symmetry, the three inner bends being free and unattached to the frame.

4. The cart as claimed in claim 1, wherein the pair of outer legs leading to the respective outer side bends are tapered outwardly from the forward end to the rear end of the frame.

5. The cart as claimed in claim 2, wherein the bar has inwardly tapered connecting legs between each outer side bend and the central bend.

6. The cart as claimed in claim 1, wherein the frame includes a pair of rear upright members and a pair of front upright members, each upright member having a lower end and an upper end, and each shelf is welded to each of the upright members.

7. The cart as claimed in claim 1, wherein each shelf has a front edge; and the upper end of the frame includes a cross bar extending across the forward end of the frame and projecting forwardly beyond the front edges of the shelves to act as a bumper.

8. The cart as claimed in claim 6, including a connecting bar connecting the upper ends of the rear upright members.

9. The cart as claimed in claim 6, wherein the bar has at least three generally V-shaped bends, the bends comprising a pair of outer side bends and a central bend on said central axis of symmetry, each outer side bend is secured to a respective front upright member, and each shelf has an outer side leg leading from the respective outer side bend and having a free end secured to a respective rear upright member.

10. The cart as claimed in claim 1, wherein each shelf has a forward end, a rear end, and outer sides, and the outer side of each tray has a tray stop forming a respective rear corner locator for a tray placed on the shelf.

11. A platter cart for carrying a plurality of loaded trays, comprising:

an upwardly extending support frame having a lower end, caster wheels secured at the lower end of the support frame, an upper end, a rear end, a forward end, and spaced opposite sides, and a central horizontal axis extending from the rear end to the forward end of the frame, the frame being wider at the rear end than the forward end;

a plurality of spaced horizontal shelves secured between the opposite sides of the frame, each shelf comprising a bar extending between the opposite sides of the frame and formed into a serpentine configuration including at least a portion of generally W-shape, the serpentine configuration having a central axis of symmetry aligned with the central horizontal axis of the frame;

each shelf having a forward end, a rear end, and outer sides;

the outer side of each shelf having a tray stop forming a respective rear corner locator for a tray placed on the shelf; and each tray stop comprising a U-shaped rod having a pair of spaced side limbs and a connecting limb extending between the side limbs and having a junction between the connecting limb and each side limb, the side limbs having free ends secured to the respective outer side of the shelf, and a rearmost side limb being bent upwardly to form said corner locator at the junction between said rearmost side limb and said connecting limb.

12. A tray-carrying cart, comprising:

an upright frame having a lower end, an upper end, a front end, and a rear end, the frame comprising a pair of front upright members and a pair of rear upright members, the front and rear upright members each having an upper end and a lower end, the rear upright members being spaced further apart than the front upright members;

a plurality of wheels each secured to the lower end of a respective upright member;

a plurality of spaced horizontal shelves secured between the upright members of the frame, each shelf comprising a single continuous bar shaped to form at least three interconnected bends of generally V-shape, the successive interconnected bends facing alternately to the front and the rear of the frame, each bend having outwardly inclined side legs, whereby a plurality of carts may be nested together when not in use;

the bends including a pair of outer side bends and at least one rearwardly facing bend between the outer side bends, each bend having a generally pointed apex, the apex of each outer side bend being secured to the respective front upright member, and the apex of the rearwardly facing bend being free and not secured to the frame; and;

the bar forming each shelf being shaped to form five interconnected bends of generally V-shape comprising the pair of outer side bends and three inner bends between the outer side bends, the three inner bends all being free and unattached to the frame.

13. The cart as claimed in claim 12, wherein the rear end of the frame is open.

\* \* \* \* \*